US012185355B2

(12) United States Patent
Yeo et al.

(10) Patent No.: US 12,185,355 B2
(45) Date of Patent: Dec. 31, 2024

(54) METHOD AND DEVICE FOR TRANSMITTING AND RECEIVING SIDELINK SIGNAL IN WIRELESS COMMUNICATION SYSTEM

(71) Applicant: Samsung Electronics Co., Ltd., Gyeonggi-do (KR)

(72) Inventors: Jeongho Yeo, Gyeonggi-do (KR); Hyunseok Ryu, Gyeonggi-do (KR); Sungjin Park, Gyeonggi-do (KR); Jinyoung Oh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 489 days.

(21) Appl. No.: 17/289,121

(22) PCT Filed: Nov. 4, 2019

(86) PCT No.: PCT/KR2019/014849
§ 371 (c)(1),
(2) Date: Apr. 27, 2021

(87) PCT Pub. No.: WO2020/091563
PCT Pub. Date: May 7, 2020

(65) Prior Publication Data
US 2021/0385821 A1 Dec. 9, 2021

(30) Foreign Application Priority Data
Nov. 2, 2018 (KR) .................. 10-2018-0133520
Feb. 14, 2019 (KR) .................. 10-2019-0017087

(51) Int. Cl.
*H04W 72/56* (2023.01)
*H04L 1/1812* (2023.01)
(Continued)

(52) U.S. Cl.
CPC ........... *H04W 72/56* (2023.01); *H04L 1/1812* (2013.01); *H04W 72/0446* (2013.01); *H04W 72/543* (2023.01)

(58) Field of Classification Search
CPC ......................... H04W 72/0446; H04W 72/10
See application file for complete search history.

(56) References Cited

U.S. PATENT DOCUMENTS

| 2013/0016649 | A1 | 1/2013 | Damnjanovic et al. |
| 2018/0019838 | A1 | 1/2018 | Yeo et al. |

(Continued)

FOREIGN PATENT DOCUMENTS

| CN | 107623951 | 1/2018 |
| KR | 1020200018210 | 2/2020 |

(Continued)

OTHER PUBLICATIONS

Qualcomm Incorporated, "Co-existence Aspects for NR-V2X and LTE-V2X", R1-1811268, 3GPP TSG RAN WG1 Meeting #94bis, Oct. 8-12, 2018, 4 pages.

(Continued)

*Primary Examiner* — Sulaiman Nooristany
(74) *Attorney, Agent, or Firm* — The Farrell Law Firm, P.C.

(57) ABSTRACT

Disclosed are: a communication technique for merging, with IoT technology, a 5G communication system for supporting a data transmission rate higher than that of 4G system; and a system therefor. The present disclosure can be applied to intelligent services (for example, smart home, smart building, smart city, smart car or connected car, health care, digital education, retail, security, and safety-related services, and the like) on the basis of 5G communication technology and IoT-related technology. The present disclosure relates to a wireless communication system, and to a method and a (Continued)

device for transmitting and receiving a sidelink signal and a physical channel.

8 Claims, 20 Drawing Sheets

(51) Int. Cl.
*H04W 72/0446* (2023.01)
*H04W 72/543* (2023.01)

(56) References Cited

U.S. PATENT DOCUMENTS

| | | | |
|---|---|---|---|
| 2018/0279291 | A1 | 9/2018 | Tilrola et al. |
| 2018/0332564 | A1 | 11/2018 | Lee et al. |
| 2019/0090250 | A1* | 3/2019 | Lee ................. H04W 72/02 |
| 2020/0045724 | A1 | 2/2020 | Lu et al. |
| 2021/0204307 | A1* | 7/2021 | Lee ................. H04W 76/14 |
| 2021/0274452 | A1* | 9/2021 | Khoryaev ............ H04W 88/04 |
| 2021/0321421 | A1* | 10/2021 | Osawa ................ H04L 1/1812 |
| 2021/0400636 | A1* | 12/2021 | Seo ................. H04L 5/0055 |

FOREIGN PATENT DOCUMENTS

| | | |
|---|---|---|
| KR | 1020200036693 | 4/2020 |
| WO | WO 2018/064179 | 4/2018 |
| WO | WO2018082571 | 5/2018 |
| WO | WO 2018/129325 | 7/2018 |
| WO | WO2018174691 | 9/2018 |

OTHER PUBLICATIONS

Qualcomm Incorporated, "Handling UCI on PUSCH for URLLC", R1-1807360, 3GPP TSG RAN WG1 Meeting #93, May 21-25, 2018, 2 pages.
ZTE, "In-Device Coexistence between NR V2X and LTE V2X", R2-1814172, 3GPP TSG RAN WG2 Meeting #103bis, Oct. 8-12, 2018, 5 pages.
Panasonic, "Discussion on Resource Allocation Mechanism for NR Sidelink", R1-1808648, 3GPP TSG RAN WG1 Meeting #94, Aug. 20-24, 2018, 3 pages.
European Search Report dated Nov. 4, 2021 issued in counterpart application No. 19879117.0-1205, 1 5 pages.
Vivo, "Remaining Issues on UL Data Transmission for URLLC", R1-1806070, 3GPP TSG RAN WG1 Meeting #92bis, May 21-25, 2018, 5 pages.
InterDigital Inc., "Discussion on Coexistence between NR V2X and LTE V2X", R1-1811217, 3GPP TSG RAN WG1 Meeting #94bis, Oct. 8-12, 2018, 3 pages.
European Search Report dated Mar. 28, 2022 Issued in counterpart application No. 19879117.0-1205, 21 pages.
PCT/ISA/210 Search Report issued on PCT/KR2019/014849, Feb. 11, 2020, pp. 5.
PCT/ISA/237 Written Opinion issued on PCT/KR2019/014849, Feb. 11, 2020, pp. 4.
Ericsson, "Coexistence Between Sidelink and Uplink Transmission", 3GPP TSG RAN WG2 #97, Tdoc R2-1700948, Athens, Greece, Feb. 3, 2017, pp. 6.
LG Electronics, "Discussion on coexistence mechanisms", 3GPP TSG RAN WG1 Meeting #94, R1-1808528, Gothenburg, Sweden, Aug. 11, 2018, pp. 4.
Intel Corporation, "Coexistence Mechanisms for eV2X Services", 3GPP TSG RAN WG1 Meeting #94bis, R1-1810781, Chengdu, China, Sep. 29, 2018, pp. 11.
Chinese Office Action dated Oct. 12, 2023 issued in counterpart application No. 201980071069.4, 17 pages.
Ericsson et al., Introduction of QoE Measurement Collection for MTSI Services, R2-1812209, 3GPP TSG-RAN2 Meeting #103, Aug. 20-24, 2018, 8 pages.
Chinese Office Action dated Mar. 20, 2024 Issued in counterpart application No. 201980071069.4, 7 pages.
Korean Office Action dated Feb. 28, 2024 issued in counterpart application No. 10-2019-0017087, 9 pages.

* cited by examiner

METHOD AND DEVICE FOR TRANSMITTING AND RECEIVING SIDELINK SIGNAL IN WIRELESS COMMUNICATION SYSTEM

PRIORITY

This application is a National Phase Entry of PCT International Application No. PCT/KR2019/014849 which was filed on Nov. 4, 2019, and claims priority to Korean Patent Application Nos. 10-2018-0133520 and 10-2019-0017087, which were filed on Nov. 2, 2018 and Feb. 14, 2019, respectively, the content of each of which is incorporated herein by reference.

TECHNICAL FIELD

The disclosure relates to a wireless communication system, and more particularly, to a method and apparatus for transmitting or receiving a sidelink signal and a physical channel.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (ME), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming. MIMO, and array antennas. Application of a cloud radio access network (RAN) as the above-described big data processing technology may also be considered an example of convergence of the 5G technology with the IoT technology.

DETAILED DESCRIPTION OF INVENTION

Technical Problem

A terminal which wants to perform communication by using a sidelink configured for communication between terminals, in particular, in a wireless communication system, may include a function of transmitting or receiving a sidelink signal based on LTE and NR. According to the function, LTE- and NR-based sidelink signal transmission and reception are simultaneously activated. Here, the terminal needs to determine a criterion for transmission and reception of an LTE-based sidelink signal and an NR-based sidelink signal at a specific time and frequency. For example, the transmission and reception of the LTE-based sidelink signal and the NR-based sidelink signal may be performed based on a configuration transmitted from a base station, may be performed based on a predetermined priority, or may be performed based on the priority of a packet to be transmitted/received. Accordingly, various embodiments of the disclosure provide a method and an apparatus in which a terminal, having an LTE- and an NR-based sidelink signal transmission/reception function, configures a priority between LTE and NR, and performs sidelink transmission or reception based on the priority.

Solution to Problem

In order to solve the above technical problem, a method for transmitting or receiving a signal by a terminal in a mobile communication system according to an embodiment of the disclosure may include: identifying a first time resource for transmission of a first signal associated with a first communication system; identifying a second time resource for reception of a second signal associated with a second communication system; identifying whether at least a part of the first time resource and the second time resource overlaps; and when at least a part of the first time resource and the second time resource overlaps, performing one of transmission of the first signal and reception of the second signal based on a quality of service (QoS) of the first signal or the second signal.

A terminal in a mobile communication system according to an embodiment may include: a transceiver for transmitting or receiving a signal to or from a base station or another terminal; and a controller configured to identify a first time resource for transmission of a first signal associated with a first communication system, identify a second time resource for reception of a second signal associated with a second communication system, identify whether at least a part of the first time resource and the second time resource overlaps, and when at least a part of the first time resource and the second time resource overlaps, perform one of transmission of the first signal and reception of the second signal based on a quality of service (QoS) of the first signal or the second signal.

Advantageous Effects of Invention

Various embodiments of the disclosure may provide a method and apparatus for transmitting or receiving a sidelink signal in a wireless communication system.

In addition, according to various embodiments of the disclosure, a terminal having an LTE- and an NR-based sidelink signal transmission/reception function may configure a priority and determine a signal and a physical channel to be transmitted or received, and may perform data transmission or reception accordingly.

MODE FOR CARRYING OUT THE INVENTION

Figure 1:
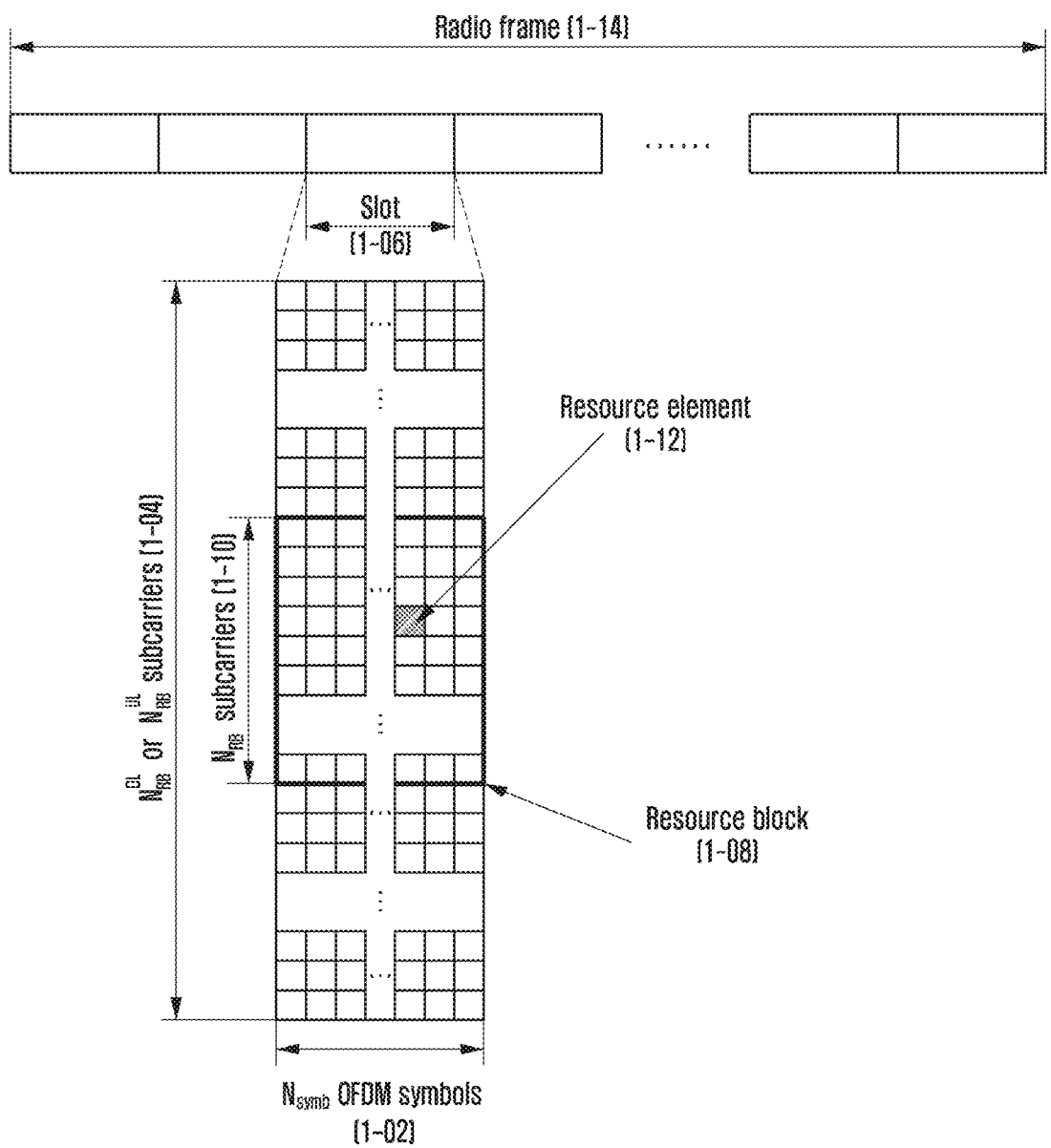
FIG. 1 illustrates a downlink or uplink time-frequency domain transmission structure in an NR system according to an embodiment of the disclosure.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

In describing the disclosure, a detailed description of relevant known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Hereinafter, a base station is a subject that performs resource allocation to a terminal and may be at least one of gNode B (gNB), eNode B (eNB), Node B, a base station (BS), a radio access unit, a base station controller, or a node on a network. A terminal may include a user equipment (UE), a mobile station (MS), a cellular phone, a smartphone, a car, a transport means (vehicle), a pedestrian, a road side unit (RSU), a computer, or a multimedia system capable of performing communication function. In the disclosure, the term "downlink (DL)" refers to a wireless transmission path of a signal transmitted by a base station to a terminal, and the term "uplink (UL)" refers to a wireless transmission path of a signal transmitted by a terminal to a base station. Although various embodiments of the disclosure will be described below with reference to NR system, various embodiments of the disclosure may also be applied to other communication systems having similar technical backgrounds or channel formats. Further, the embodiments of the disclosure may also be applied to other communication systems through partial modifications thereof in a range that does not greatly deviate from the scope of the disclosure based on the determination made by those skilled in the art.

In various embodiments of the disclosure, the conventional terms of "a physical channel" and "a signal" may be interchangeably used with data or a control signal. For example, a physical downlink shared channel (PDSCH) is a physical channel through which data is transmitted, but a PDSCH may denote data in an embodiment of the disclosure.

Hereinafter, in various embodiments of the disclosure, higher layer signaling is a signal transferring method for transferring a signal by a base station to a terminal by using a downlink data channel of a physical layer, or transferring a signal by a terminal to a base station by using an uplink data channel of a physical layer, and may be referred to as radio resource control (RRC) signaling or a MAC control element (CE).

A wireless communication system has evolved into a broadband wireless communication system that provides a high speed and high quality packet data service, like the communication standards, for example, high speed packet access (HSPA), long term evolution (LTE or evolved universal terrestrial radio access (E-UTRA)), and LTE-advanced (LTE-A) of 3GPP, high rate packet data (HRPD) and ultra-mobile broadband (UMB) of 3GPP2, 802.16e of IEEE, and the like, departing from the early stage of providing only voice-oriented services. Further, communication standards for 5G or new radio (NR) have been made in a fifth generation wireless communication system.

An NR system, which is a representative example of the broadband wireless communication system, adopts an orthogonal frequency division multiplexing (OFDM) scheme for a downlink and an uplink. More specifically, a cyclic-prefix OFDM (CP-OFDM) scheme is adopted for a downlink, and two schemes including a CP-OFDM scheme and a discrete Fourier transform spreading OFDM (DFT-S-OFDM) scheme are adopted for an uplink. An uplink refers to a radio link through which a terminal (user equipment (UE)) or a mobile station (MS) transmits data or control signals to a base station (BS or gNode B). A downlink refers to a radio link through which a base station transmits data or control signals to a terminal. A sidelink may refer to a radio link through which data transmission is performed between a terminal and another or between a terminal and an RSU. In multiple access schemes as described above, time-frequency resources, on which data or control information is to be carried to each user, are usually allocated and managed to satisfy orthogonality, i.e., not to overlap to each other, so that data or control information for each user is distinguished.

The NR system employs a hybrid automatic repeat request (HARQ) scheme that retransmits corresponding data in a physical layer if decoding fails at the initial transmission. In a HARQ scheme, if a receiver fails to accurately decode data, the receiver transmits, to a transmitter, information (negative acknowledgement (NACK)) of notifying of decoding failure, to allow the transmitter to retransmit the corresponding data in a physical layer. The receiver combines data retransmitted by the transmitter with the previous data, for which decoding has failed, to increase a data reception performance. In addition, if the receiver accurately decodes data, the receiver transmits, to the transmitter, information (acknowledgement (ACK)) of notifying of decoding success, to allow the transmitter to transmit new data.

FIG. 1 illustrates a basic structure of a time-frequency domain, which is a radio resource region in which data or a control channel is transmitted through a downlink or uplink in an NR system according to an embodiment of the disclosure.

Referring to FIG. 1, the horizontal axis indicates the time domain, and the vertical axis indicates the frequency domain. The minimum transmission unit in the time domain is an OFDM symbol, and $N_{symb}$ OFDM symbols 1-02 are gathered to configure one slot 1-06. The length of a subframe is defined as 1.0 ms, and a radio frame 1-14 is defined as 10 ms. The minimum transmission unit in the frequency domain is a subcarrier, and the bandwidth of the entire system transmission band is configured by a total of $N_{BW}$ subcarriers 1-04.

In the time-frequency domain, the basic resource unit is a resource element (RE) 1-12, and an RE is expressed by an OFDM symbol index and a subcarrier index. A resource block (RB) 1-08 (or physical resource block (PRB)) is defined by $N_{symb}$ consecutive OFDM symbols 1-02 in the time domain and $N_{RB}$ consecutive subcarriers 1-10 in the frequency domain. Therefore, one RB 1-08 is configured by $N_{symb} \times N_{RB}$ REs. Generally, the minimum transmission unit of data is an RB unit. In the NR system, $N_{symb}=14$, $N_{RB}=12$, and $N_{BW}$ is proportional to the bandwidth of the system transmission band. The data rate may increase in proportion to the number of RBs scheduled for the terminal. In the NR system, in the case of a frequency division duplex (FDD) system in which downlink and uplink are operated at separate frequencies, the downlink transmission bandwidth and the uplink transmission bandwidth may be different from each other. The channel bandwidth indicates a radio frequency (RF) bandwidth corresponding to the system transmission bandwidth. Table 1 and Table 2 show part of a correspondence relationship between a system transmission bandwidth, subcarrier spacing, and a channel bandwidth defined in the NR system at a frequency bandwidth below 6 GHz and at a frequency bandwidth above 6 GHz, respectively. For example, in the NR system which has a 100 MHz channel bandwidth with 30 kHz subcarrier spacing, the transmission bandwidth is configured by 273 RBs. In the following. N/A may be a combination of a bandwidth and a subcarrier, which is not supported by the NR system.

TABLE 1

| Channel bandwidth $BW_{channel}$ [MHz] | Subcarrier spacing | 5 | 10 | 20 | 50 | 80 | 100 |
|---|---|---|---|---|---|---|---|
| Transmission bandwidth configuration $N_{RB}$ | 15 kHz | 25 | 52 | 106 | 270 | N/A | N/A |
| | 30 kHz | 11 | 24 | 51 | 133 | 217 | 273 |
| | 60 kHz | N/A | 11 | 24 | 65 | 107 | 135 |

TABLE 2

| Channel bandwidth $BW_{channel}$ [MHz] | Subcarrier spacing | 50 | 100 | 20 | 50 |
|---|---|---|---|---|---|
| Transmission bandwidth configuration $N_{RB}$ | 60 kHz | 66 | 132 | 264 | N/A |
| | 120 kHz | 32 | 66 | 132 | 264 |

In the NR system, scheduling information for downlink data or uplink data may be transmitted from a base station to a terminal via downlink control information (DCI). The DCI is defined according to various formats, and the DCI may indicate whether it is scheduling information (UL grant) for uplink data or scheduling information (DL grant) for downlink data, whether it is a compact DCI having a small amount of control information, whether or not spatial multiplexing using multiple antennas is applied, or whether or not DCI for power control is applied, according to each format. For example, DCI format 1-1, which is scheduling control information (DL grant) for downlink data, may include at least one of the following pieces of control information.

Carrier indicator: indicates a carrier frequency at which transmission is performed.

DCI format indicator: DCI format indicator indicates whether the corresponding DCI is for downlink or for uplink.

Bandwidth part (BWP) indicator: indicates a BWP in which transmission is performed.

Frequency domain resource assignment: indicates an RB of the frequency domain, which is allocated for data transmission. A resource is determined according to a system bandwidth and a resource allocation scheme.

Time domain resource assignment: indicates a slot and an OFDM symbol of the slot, in which a data-related channel is to be transmitted.

VRB-to-PRB mapping: indicates a mapping scheme by which a virtual RB (VRB) index is mapped to a physical RB (PRB) index.

Modulation and coding scheme (MCS): indicates a coding rate and a modulation scheme used for data transmission. That is, MCS may indicate a coding rate value capable of indicating a transport block size (TBS) and channel coding information together with information relating to QPSK, 16QAM, 64QAM, and 256QAM.

Code block group (CBG) transmission information: indicates information on a CBG which is transmitted when retransmission in units of CBG is configured.

HARQ process number: indicates a process number of HARQ.

New data indicator: indicates whether HARQ transmission is initial transmission or retransmission.

Redundancy version: indicates the redundancy version of HARQ.

Transmit power control (TPC) command for physical uplink control channel (PUCCH): indicates a TPC command for the PUCCH serving as an uplink control channel.

In the case of PUSCH transmission, time-domain resource assignment may be performed based on information about a slot in which a PUSCH is transmitted, a start symbol position S in the corresponding slot, and the number L of symbols to which the PUSCH is mapped. In the above. S may be a relative position from the start of a slot, L may be the number of consecutive symbols, and S and L may be determined based on a start and length indicator value (SLIV) defined as follows.

if (L−1) ≤ 7 then
   SLIV=14 · (L−1)+S
else
   SLIV=14 · (14−L+1)+(14−1−S)
where 0<7≤14−S Generally, in the NR system, a terminal may receive, through RRC configuration, configuration of a table in which an SLIV value, a PDSCH or PUSCH mapping type, and information on a slot in which a PDSCH or PUSCH is transmitted are included in one row. Thereafter, for the time-domain resource assignment of the DCI, by indicating an index value in the table configured as above, a base station may transmit, to a terminal, the SLIV value, the PDSCH or PUSCH mapping type, and information on the slot in which the PDSCH or PUSCH is transmitted.

In NR system, the PDSCH or PUSCH mapping type is defined by type A and type B. In the PDSCH or PUSCH mapping type A, the first symbol among demodulation reference signal (DMRS) symbols is located at the second or the third OFDM symbol in a slot. In the PDSCH or PUSCH mapping type B, the first symbol among DMRS symbols is located at the first OFDM symbol in a time domain resource assigned via PUSCH transmission.

The DCI may be subjected to a channel coding and modulation process, and may then be transmitted through a physical downlink control channel (PDCCH), which is a downlink physical control channel.

Generally, the DCI is scrambled by a specific radio network temporary identifier (RNTI) (or a terminal identifier), independently for each terminal, a cyclic redundancy check (CRC) is added thereto, and channel coding thereof is performed, whereby each independent PDCCH is configured and transmitted. The PDCCH is mapped in a control resource set (CORESET) configured for the terminal and transmitted.

The downlink data may be transmitted through a physical downlink shared channel (PDSCH) serving as a physical channel for downlink data transmission. The PDSCH may be transmitted after the control resource set, and scheduling information such as a specific mapping location and modulation scheme in the time and the frequency domain is determined based on DCI transmitted through the PDCCH.

The base station may report, to the terminal, the modulation scheme applied to a PDSCH to be transmitted, and the size (TBS) of data to be transmitted, based on an MCS among the control information included in the DCI. In an embodiment, the MCS may be configured by 5 bits or more or fewer bits. The TBS corresponds to a size before channel coding for error correction is applied to data (transport block, TB) to be transmitted by a base station.

In an embodiment, a transport block (TB) may include a medium access control (MAC) header, a MAC control element (CE), one or more MAC service data units (SDUs), and padding bits. Alternatively, the TB may indicate the unit of data, which is dropped from a MAC layer to a physical layer, or a MAC protocol data unit (MAP PDU).

The modulation schemes supported by the NR system are quadrature phase shift keying (QPSK), 16 quadrature amplitude modulation (16 QAM), 64 QAM, and 256 QAM. Modulation orders (Qm) of the QPSK, 16 QAM, 64 QAM, and 256 QAM correspond to 2, 4, 6, and 8, respectively. That is, 2 bits per symbol in the case of QPSK modulation, 4 bits per symbol in the case of 16 QAM modulation, 6 bits per symbol in the case of 64 QAM modulation, and 8 bits per symbol in the case of 256 QAM modulation may be transmitted.

Figure 2:
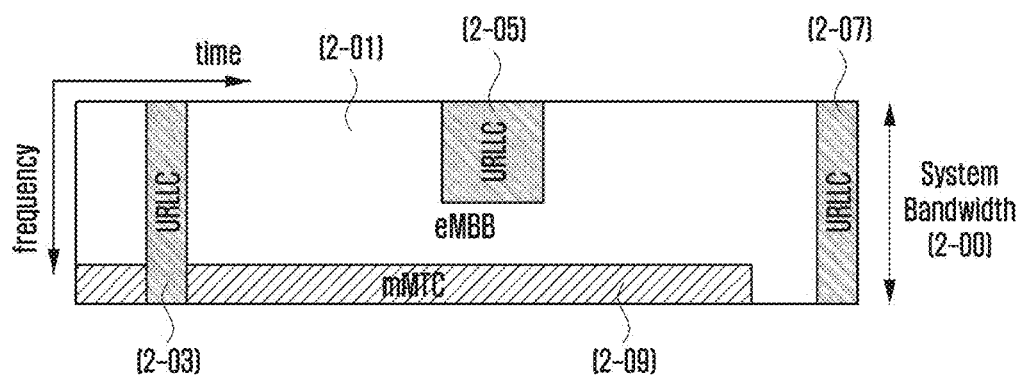
FIG. 2 illustrates an aspect in which pieces of data for enhanced mobile broadband (eMBB), ultra-reliable and low-latency communications (URLLCs), and massive machine type communication (mMTC) are allocated in a frequency-time resource in a communication system according to an embodiment of the disclosure.
Figure 3:
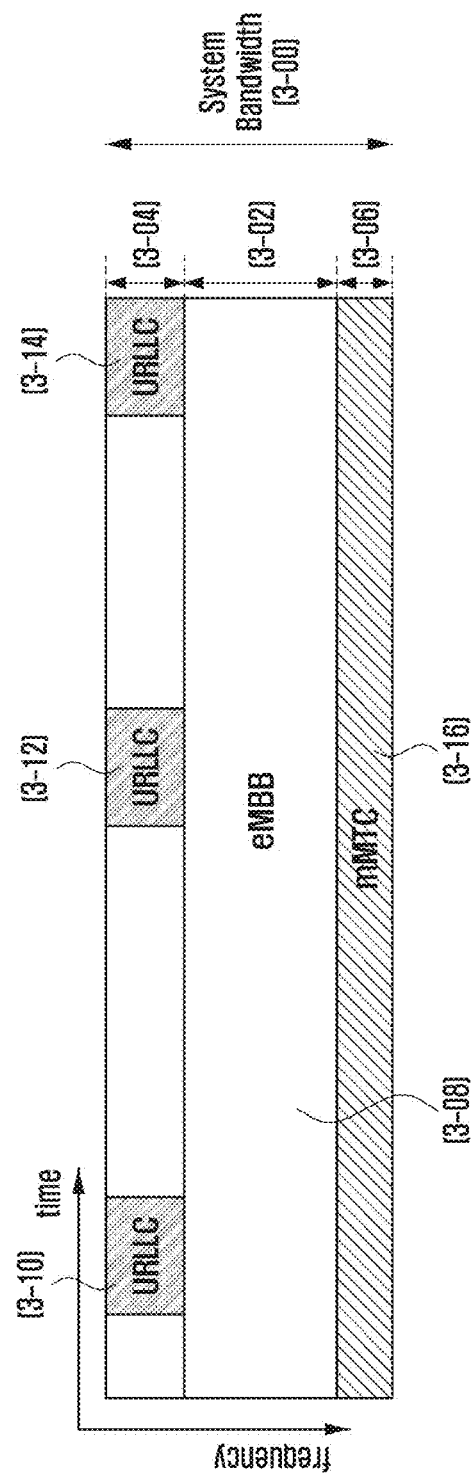
FIG. 3 illustrates an aspect in which pieces of data for eMBB, URLLC, and mMTC are allocated in a frequency-time resource in a communication system according to an embodiment of the disclosure.

FIGS. 2 and 3 illustrate an aspect in which pieces of data for eMBB, URLLC, and mMTC, which are services considered in the 5G or NR system, are allocated in frequency-time resources.

Referring to FIGS. 2 and 3, there may be presented a scheme in which frequency and time resources are allocated for performing information transmission in each system.

First, FIG. 2 illustrates an aspect in which pieces of data for eMBB, URLLC, and mMTC are allocated in the entire system frequency bandwidth 2-00. In the middle of allocation and transmission of eMBB 2-01 and mMTC 2-09 in a specific frequency bandwidth, if URLLC data 2-03, 2-05, and 2-07 occur and transmission thereof is thus necessary, the URLLC data 2-03, 2-05, and 2-07 may be transmitted without emptying the portion in which the eMBB 2-01 and the mMTC 2-09 have been already allocated and without transmitting the same. Since the URLLC needs to reduce a delay time in the middle of service, URLLC data 2-03, 2-05, and 2-07 may be allocated to a portion of the resource 2-01 to which the eMBB is allocated, and thus may be transmitted. Of course, in the case where URLLC is additionally allocated and transmitted in the resource to which the eMBB is allocated, eMBB data may not be transmitted in an overlapping frequency-time resource, and thus the transmission performance of the eMBB data may be lowered. That is, in the above case, eMBB data transmission failure due to URLLC allocation may occur.

In FIG. 3, the entire system frequency bandwidth 3-00 may be divided into sub-bands 3-02, 3-04, and 3-06 and used for transmission of a service and data therein. Information associated with the sub-band configuration may be predetermined, and the information may be transmitted to a terminal by a base station via higher layer signaling. Alternatively, the information associated with the sub-bands may be arbitrarily divided by a base station or a network node and provide services to the terminal without transmitting separate sub-band configuration information. FIG. 3 illustrates that the sub-band 3-02 is used for eMBB data transmission, the sub-band 3-04 is used for URLLC data transmission, and the sub-band 3-06 is used for mMTC data transmission.

Throughout the embodiment, the length of a transmission time interval (TTI) used for URLLC transmission may be shorter than the length of TTI used for eMBB or mMTC transmission. In addition, the response of information related to the URLLC may be transmitted faster than that of eMBB or mMTC, and accordingly information transmission or reception with a low delay is possible. The structures of physical layer channels used for transmission of the three types of services or data may be different from each other. For example, at least one of the length of a transmission time interval (TTI), the allocation unit of frequency resources, a structure of a control channel, and a data mapping method may be different.

In the above description, three types of services and three types of data are described. Alternatively, an even greater number of types of services and data corresponding thereto may exist, and details of the disclosure may be applied thereto.

In order to explain a method and apparatus proposed in the embodiment, the terms "physical channel" and "signal", pertaining to the NR system may be used. However, details of the disclosure may be applied to a wireless communication system other than the NR system.

Figure 4:
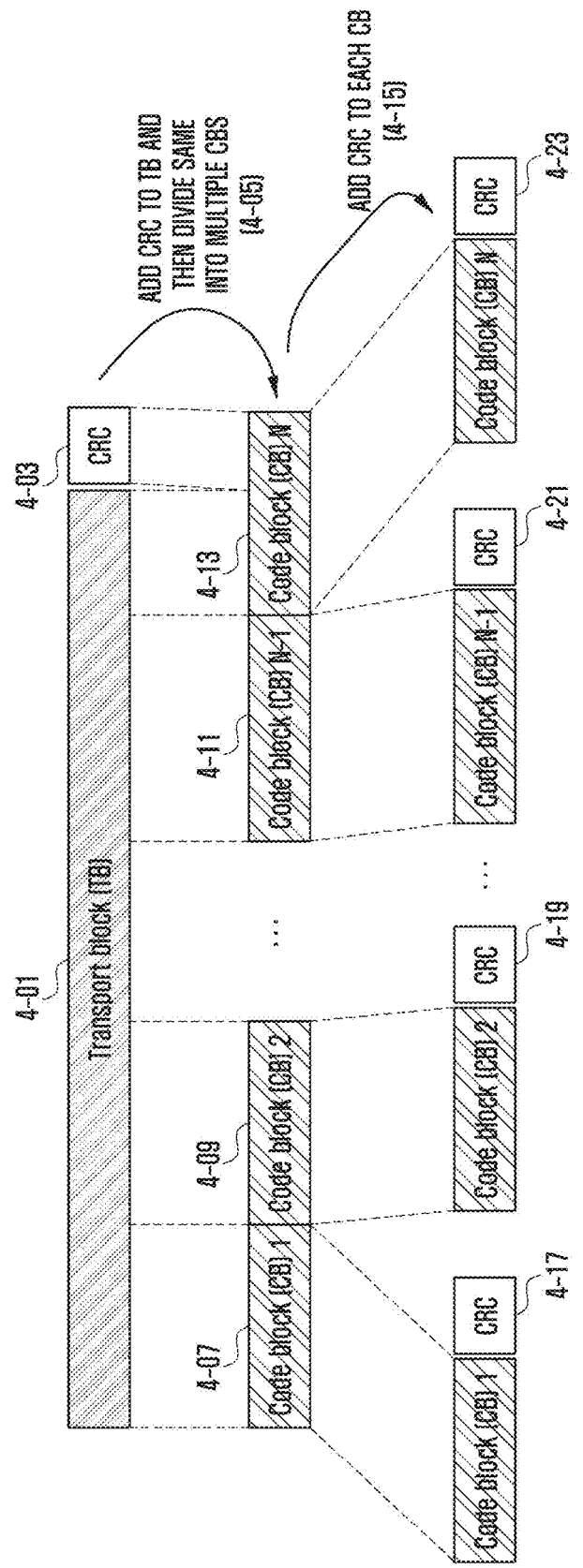
FIG. 4 illustrates a structure in which a single transport block is divided into multiple code blocks and a cyclic redundancy check (CRC) is added thereto according to an embodiment of the disclosure.

FIG. 4 illustrates a process in which one transport block is divided into several code blocks and a CRC is added thereto according to an embodiment of the disclosure.

Referring to FIG. 4, a CRC 4-03 may be added to the last part or the first part of one transport block (TB) 4-01 to be transmitted in an uplink or a downlink. The CRC 4-03 may have 16 bits, 24 bits, or a pre-fixed number of bits, or may have a variable number of bits depending on channel conditions, and may be used to determine whether channel coding is successful. The TB 4-01 and a block to which CRC 4-03 is added may be divided into a plurality of code blocks (CBs) 4-07, 4-09, 4-11, and 4-13 (indicated by reference numeral 4-05). The divided code blocks 4-07, 4-09, 4-11, and 4-13 may have a predetermined maximum size, and in this case, the last code block 4-13 may be smaller in size than those of other code blocks. Alternatively, a length of the last code block 4-13 may be adjusted to be the same as that of the other code blocks by adding zeros, random values, or ones thereto. CRCs 4-17, 4-19, 4-21, and 4-23 may be added to the divided code blocks, respectively (indicated by reference numeral 4-15). The CRCs 4-17, 4-19, 4-21, and 4-23 may include 16 bits, 24 bits, or a pre-fixed number of bits, and may be used to determine whether channel coding is successful.

The TB 4-01 and cyclic generator polynomial may be used in order to generate the CRC 4-03, and the cyclic generator polynomial may be defined in various methods. For example, if it is assumed that cyclic generator polynomial $g_{CRC24A}(D)=[D^{24}+D^{23}+D^{18}+D^{17}+D^{14}+D^{11}+D^{10}+D^7+D^6+D^5+D^4+D^3+D+1]$ for a 24-bit CRC, and L=24, with respect to TB data $a_0, a_1, a_2, a_3, \ldots, a_{A-1}$, CRC $p_0, p_1, p_2, p_3, \ldots, p_{L-1}$ may determine $p_0, p_1, p_2, p_3, \ldots, p_{L-1}$ as a value in which the remainder becomes zero by dividing $a_0D^{A+23}+a_1D^{A+22}+\ldots+a_{A-1}D^{24}+p_0D^{23}+p_1D^{22}+\ldots p_{22}D^1+p_{23}$ by the $g_{CRC24A}(D)$. In the above example, the CRC length "L" is assumed to be 24 as an example, but the CRC length "L" may be determined to have different lengths, such as 12, 16, 24, 32, 40, 48, 64, and the like. Through this process, the CRC 4-03 is added to the TB 4-01, and the TB having CRC added thereto may be divided into N CBs 4-07, 4-09, 4-11, and 4-13. CRCs 4-17, 4-19, 4-21, and 4-23 may be added to each of the divided CBs 4-07, 4-09, 4-11, and 4-13 (indicated by reference numeral 4-15). The CRCs 4-17, 4-19, 4-21, and 4-23 added to the CBs 4-07, 4-09, 4-11, and 4-13 may have a different length than that of the CRC 4-03 added to the TB 4-01 or may use a different cyclic generator polynomial. In addition, the CRC 4-03 added to the TB 4-01 and the CRCs 4-17, 4-19, 4-21, and 4-23 added to the code blocks 4-07, 4-09, 4-11, and 4-13 may be omitted depending on the type of a channel code to be applied to the code block. For example, if LDPC codes other than turbo codes are applied to code blocks, CRCs 4-17, 4-19, 4-21, and 4-23 to be inserted for each code block may be omitted. However, even if the LDPC is applied, the CRCs 4-17, 4-19, 4-21, and 4-23 may be added to the code block as it is. In addition, CRC may be added or omitted even if a polar code is used.

As described above in FIG. 4, the maximum length of one code block is determined according to the type of channel coding applied to a TB to be transmitted, and the TB and CRC, which is added to the TB, are divided into code blocks according to the maximum length of the code block. In the conventional LTE system, CRC for CB is added to the divided CB, data bits and the CRC of the CB are encoded with a channel code, and thus coded bits are determined and a number of bits, which perform predetermined rate matching to each of coded bits, may be determined.

The following embodiments provide a method and apparatus for performing data transmission or reception between a base station and a terminal or between terminals. In this case, data may be transmitted from one terminal to a plurality of terminals, or may be transmitted from one terminal to one terminal. Alternatively, the embodiment may correspond to a case where data is transmitted from a base station to a plurality of terminals. However, the disclosure may be applied to various cases without being limited thereto.

Figure 5:
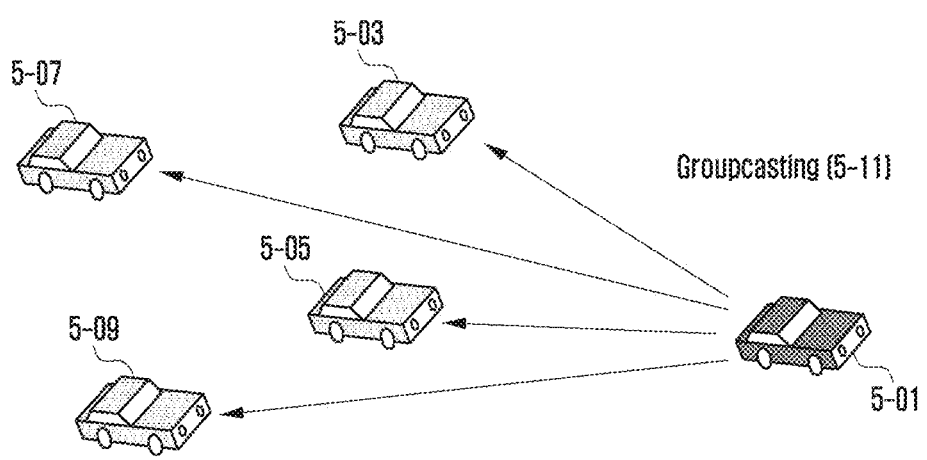
FIG. 5 illustrates an example of groupcasting for transmitting common data to a plurality of terminals by a single terminal according to an embodiment of the disclosure.

FIG. 5 illustrates an example of groupcasting 5-11 for transmitting common data to a plurality of terminals 5-03, 5-05, 5-07, and 5-09 by a single terminal 5-01, according to an embodiment of the disclosure. The terminal 5-01 may be moved when the terminal is in a car. Separate control information, a physical control channel, and data may be transmitted for the groupcasting.

Figure 6:
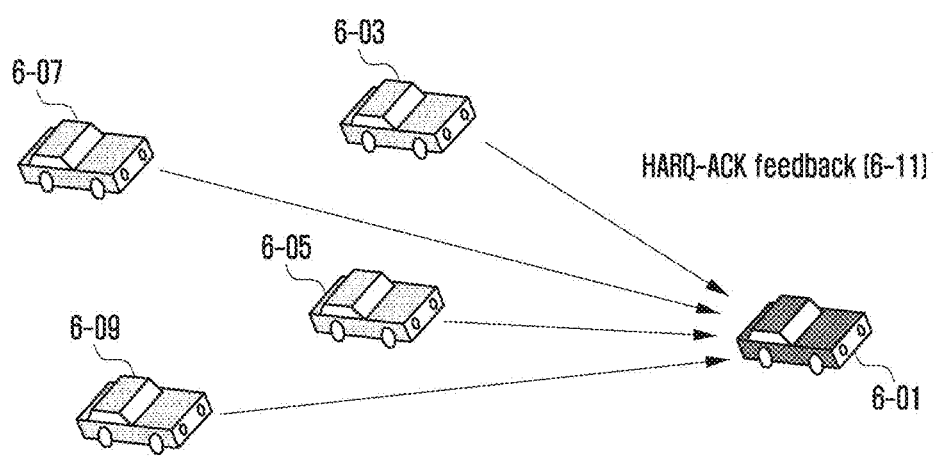
FIG. 6 illustrates a procedure in which terminals, which have received common data by groupcasting, transmit information relating to success or failure of reception of the data to a terminal having transmitted the data according to an embodiment of the disclosure.

FIG. 6 illustrates a procedure in which terminals 6-03, 6-05, 6-07, and 6-09, which have received common data by groupcasting, transmit information relating to success or failure of reception of the data to a terminal 6-01 having transmitted the data according to an embodiment of the disclosure. The information may include information such as HARQ-ACK feedback (indicated by reference numeral 6-11). In addition, the terminals 6-03, 6-05, 6-07, and 6-09 may have an LTE-based sidelink function or an NR-based sidelink function. If a terminal has only an LTE-based sidelink function, the terminal may not transmit or receive an NR-based sidelink signal and physical channel. In various embodiments of the disclosure, sidelink may be used together with PC5, V2X, or device-to-device (D2D). FIGS. 5 and 6 illustrate an example of transmission and reception according to groupcasting, but the descriptions may also be applied to a unicast signal transmission and reception between terminals.

Figure 7:
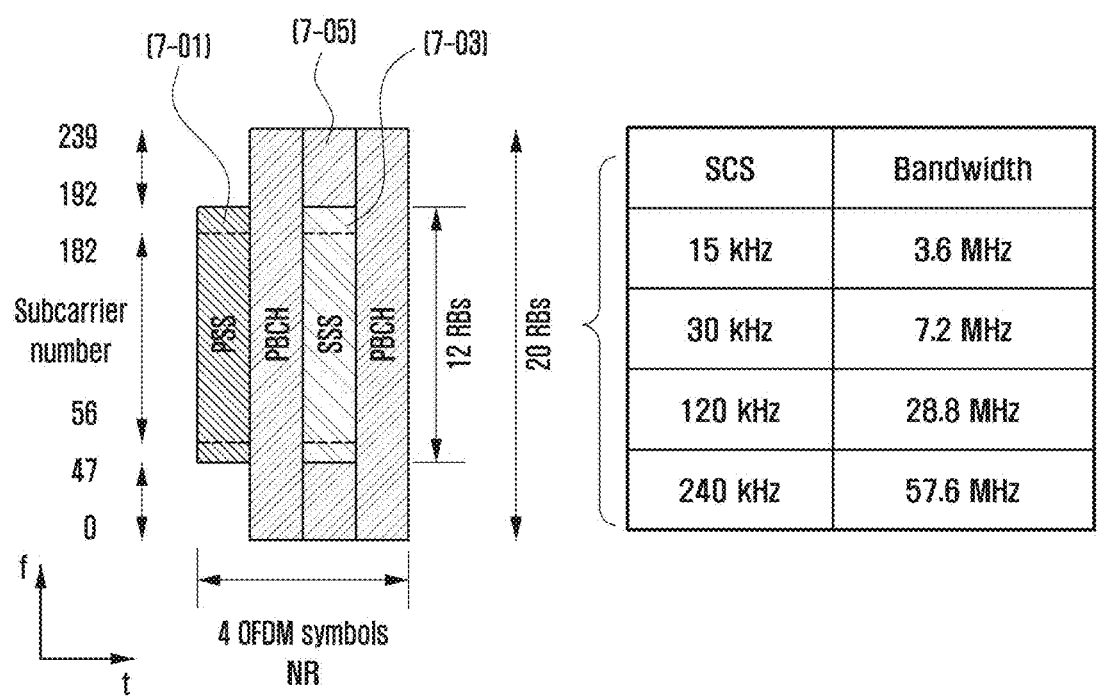
FIG. 7 illustrates an aspect in which synchronization signals and a physical broadcast channel (PBCH) of a 3GPP NR system are mapped in a frequency and time domain according to an embodiment of the disclosure.

FIG. 7 illustrates an aspect in which synchronization signals and a physical broadcast channel (PBCH) of 3GPP NR system are mapped in a frequency and time domain according to an embodiment of the disclosure. A primary synchronization signal (PSS) 7-01, an auxiliary synchronization signal (secondary synchronization signal (SSS)) 7-03, and PBCHs 7-05 are mapped over 4 OFDM symbols, the PSS 7-01 and the SSS 7-03 are mapped to 12 RBs, and the PBCH is mapped to 20 RBs. The table in FIG. 7 shows that the frequency band for 20 RBs changes according to a subcarrier spacing (SCS). A resource domain in which the PSS 7-01, SSS 7-03, and PBCH 7-05 are transmitted may be called a SS/PBCH block.

Figure 8:
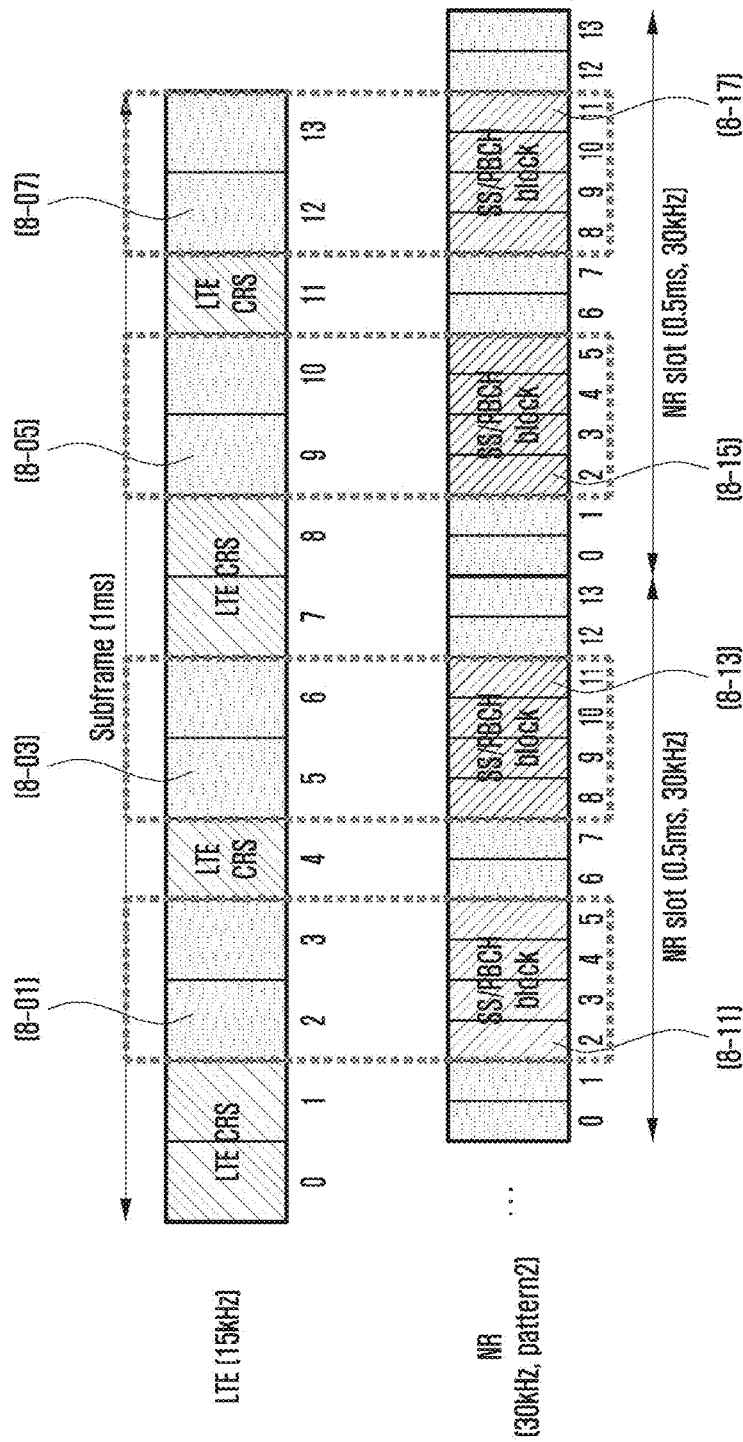
FIG. 8 illustrates symbols in a slot to which a single SS/PBCH block is mapped according to an embodiment of the disclosure.

FIG. 8 illustrates symbols in a slot to which a single SS/PBCH block is mapped according to an embodiment of the disclosure. FIG. 8 illustrates an example of a conventional LTE system using subcarrier spacing of 15 kHz and an NR system using subcarrier spacing of 30 kHz. and SS/PBCH blocks 8-11, 8-13, 8-15, and 8-17 of the NR system are designed to be transmitted at positions 8-01, 8-03, 8-05, and 8-07 at which cell-specific reference signals (CRS), which are always transmitted in the LTE system, can be avoided. The purpose of the design may be to allow an LTE system and an NR system to coexist in a single frequency band.

Figure 9:
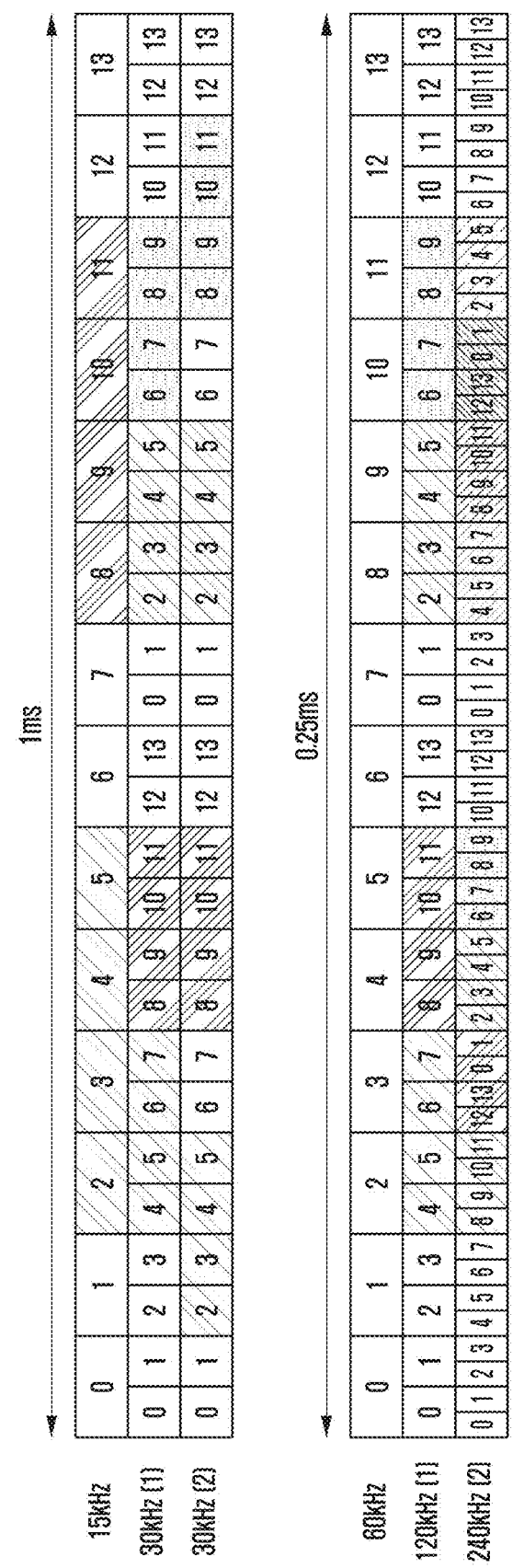
FIG. 9 illustrates, based on a subcarrier spacing, symbols through which a SS/PBCH block can be transmitted among symbols within 1 ms or less according to an embodiment of the disclosure.
Figure 10:
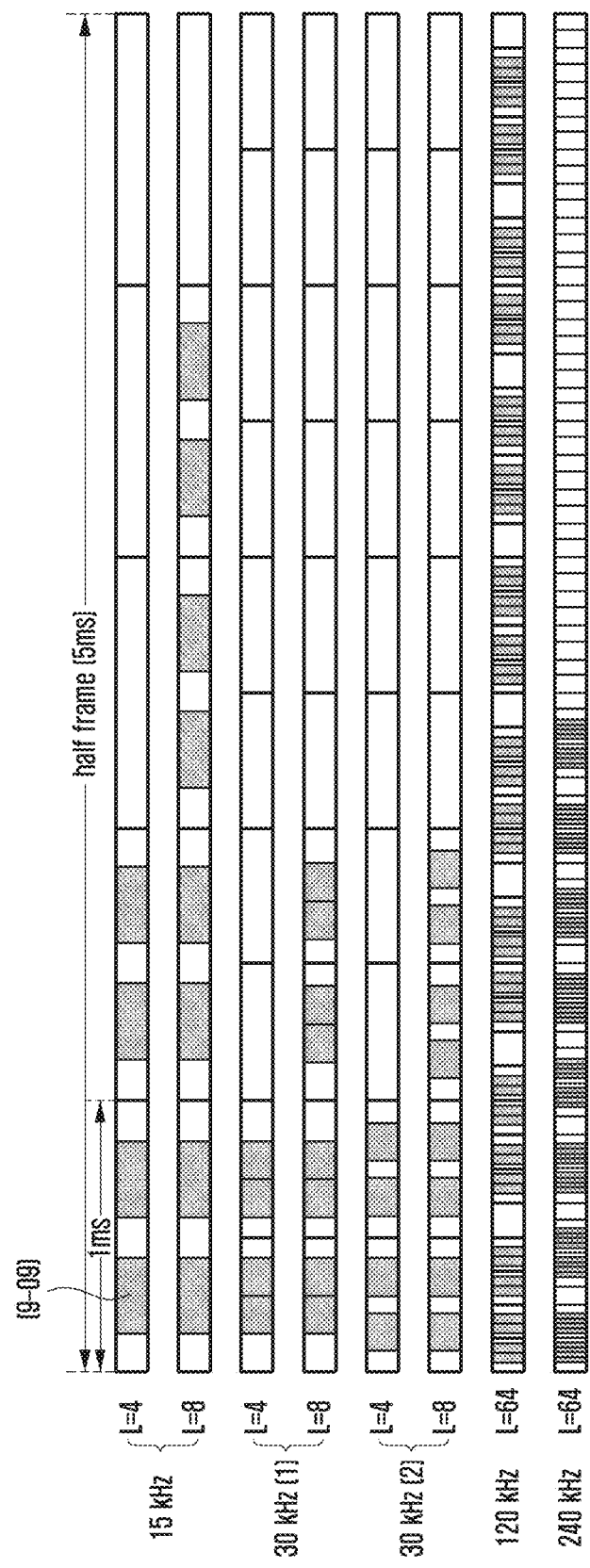
FIG. 10 illustrates, based on a subcarrier spacing, slots and symbols through which a SS/PBCH block can be transmitted among symbols and slots within 5 ms or less according to an embodiment of the disclosure.

FIG. 9 illustrates, based on subcarrier spacing, symbols through which an SS/PBCH block can be transmitted among symbols within 1 ms or less according to an embodiment of the disclosure. FIG. 10 illustrates, based on subcarrier spacing, slots and symbols through which an SS/PBCH block can be transmitted among symbols and slots within 5 ms or less according to an embodiment of the disclosure. In the domain through which the SS/PBCH block can be transmitted, an SS/PBCH block is not always required to be transmitted, and a SS/PBCH block may be transmitted or may not be transmitted according to the selections of a base station.

In various embodiments of the disclosure, a sidelink control channel may be called a physical sidelink control channel (PSCCH), and a sidelink shared channel or a sidelink data channel may be called a physical sidelink shared channel (PSSCH). In addition, a broadcast channel which is broadcasted together with a synchronization signal may be called a physical sidelink broadcast channel (PSBCH), and a channel for feedback transmission may be called a physical sidelink feedback channel (PSFCH). In order to perform feedback transmission, a PSCCH or a PSSCH may be used. The channels may be referred to as an LTE-PSCCH, an LTE-PSSCH, an NR-PSCCH, an NR-PSSCH, and the like according to communication systems in which the channels are transmitted.

First Embodiment

The first embodiment relates to a method for determining transmission and reception in a terminal capable of performing LTE sidelink signal transmission and NR sidelink signal reception. The first embodiment will be described with reference to FIG. 11.

Figure 11:
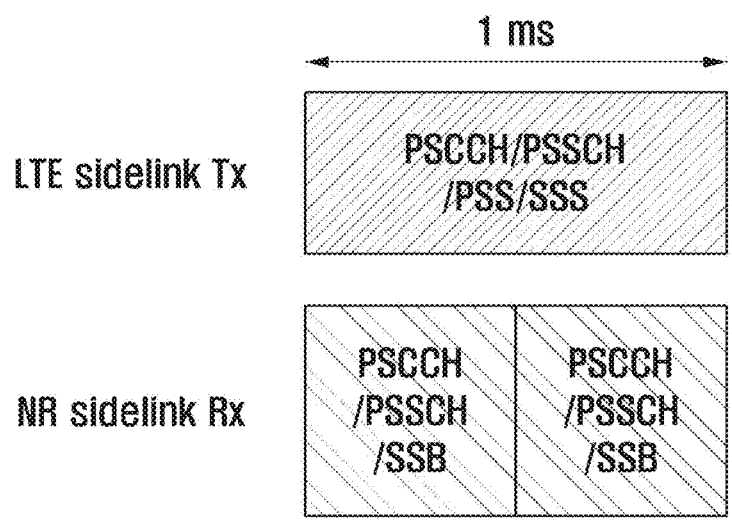
FIG. 11 illustrates an example in which, when groupcast data is transmitted, terminals in a group transmit HARQ-ACK feedback by using a common resource according to an embodiment of the disclosure.

FIG. 11 illustrates an example in which a time resource used for transmission of an LTE sidelink signal and a channel by a single terminal and a time resource used for reception of or attempted reception of an NR sidelink signal and a channel overlap.

Although the embodiment is described under the assumption that the subframe boundary for LTE sidelink transmission and the subframe boundary for NR sidelink reception match, the method provided by the disclosure can be applied even if the boundary does not match. As illustrated in FIG. 11, when there is data to be transmitted through an LTE sidelink or data transmission therethrough is scheduled, a terminal needs to transmit the relevant signal and channel through the LTE sidelink, and at the same time, the terminal needs to receive the NR sidelink signal through a time resource used for reception of the NR sidelink signal. However, if a terminal is unable to simultaneously perform transmission and reception, that is, the terminal is in a situation, such as an example of FIG. 11, in which the corresponding terminal has a half-duplex restriction, the terminal selects and performs one of LTE sidelink transmission and NR sidelink reception. This can be defined as the case where an event occurs.

When the above event occurs or when the event is identified or determined, the terminal may use one of the following methods or combine and use one or more methods among the following methods in order to perform transmission and reception operations. When one or more methods are used in combination, priorities may be configured for different methods.

Method 1: Transmission of an LTE sidelink signal or a channel is always possible. Method 1 may be applied when there is data or a control signal to be transmitted through the LTE sidelink. This is because there is no guarantee that there is a signal or a physical channel to be received through the NR sidelink at a time when the LTE sidelink transmission needs to be performed. Therefore, an NR sidelink reception operation may be omitted at a time when a synchronization signal, a PSSCH, a PSCCH, or the like are transmitted through the LTE sidelink. The NR sidelink reception operation may include data decoding and blind reception operation (blind detection) of a control channel.

Method 2: Transmission and reception operations may be determined by using a priority of an LTE sidelink data packet to be transmitted. It is possible to determine whether to transmit an LTE-PSSCH or perform an NR sidelink reception operation by comparing a priority of a transport block to be transmitted through the LTE-PSSCH with a preconfigured priority threshold. The priority may be determined based on a value transferred from a higher layer, and may be determined based on values such as a ProSe per-packet priority (PPPP) or a ProSe per-packet reliability (PPPR). For example, when the priority of a transport block to be transmitted through the LTE-PSSCH is called N_LTE, and the preconfigured priority threshold is called Priority_threshold, the LTE-PSSCH may be transmitted when N_LTE is less than or equal to Priority_threshold as a result of comparison between the N_LTE and the Priority_threshold. That is, in the above case, the LTE sidelink transmission operation is performed. On the contrary, when the N_LTE is greater than the Priority_threshold, an NR sidelink reception operation is performed instead of the LTE sidelink transmission operation. The Priority_threshold may be determined according to the configuration of a base station, but may be a value fixed in advance or a value which is changed and applied according to an LTE sidelink configuration or a region.

Method 3. When the LTE-PSSCH is transmitted, it may be determined whether to perform LTE sidelink transmission or NR sidelink reception according to whether retransmission of a transport block transmitted through the LTE-PSSCH is possible. If the transport block to be transmitted through the LTE-PSSCH is retransmitted, the NR sidelink reception operation may be performed instead of the LTE sidelink transmission operation. This is because the same transport block has already been initially transmitted and thus a gain obtained by performing retransmission may not be great.

Method 4: It is possible to determine whether to perform LTE sidelink transmission or NR sidelink reception according to the type of a signal or a channel to be received through the NR sidelink. For example, when HARQ-ACK feedback for data previously transmitted through the NR sidelink in a corresponding slot is scheduled to be transmitted, a terminal may perform an NR sidelink reception operation instead of an LTE sidelink transmission operation. Alternatively, when HARQ-ACK feedback for data previously transmitted through the NR sidelink in the corresponding slot is scheduled to be transmitted, it is possible to determine whether to perform LTE sidelink transmission or NR sidelink reception by comparing the previously transmitted data, that is, a priority value of the corresponding transport block, with a priority value of an LTE sidelink signal to be transmitted. In the above, whether to perform LTE sidelink transmission or NR sidelink reception may be determined by using a different quality of service (QoS) value instead of the priority value of the data previously transmitted through the NR sidelink. In addition, method 4 may be a method for determining whether to perform LTE sidelink transmission or NR sidelink reception depending on whether a candidate signal or channel to be received through the NR sidelink is a signal or channel for synchronization purposes, or a data channel or a feedback channel.

A method that needs to be used among the above methods may be preconfigured in a terminal, or may be configured via higher layer signaling. In addition, the terminal may previously receive parameters required for determining each of the above methods from a base station.

Second Embodiment

The second embodiment relates to a method for determining transmission and reception in a terminal capable of performing LTE sidelink signal reception and NR sidelink signal transmission. The second embodiment will be described with reference to FIG. 12.

Figure 12:
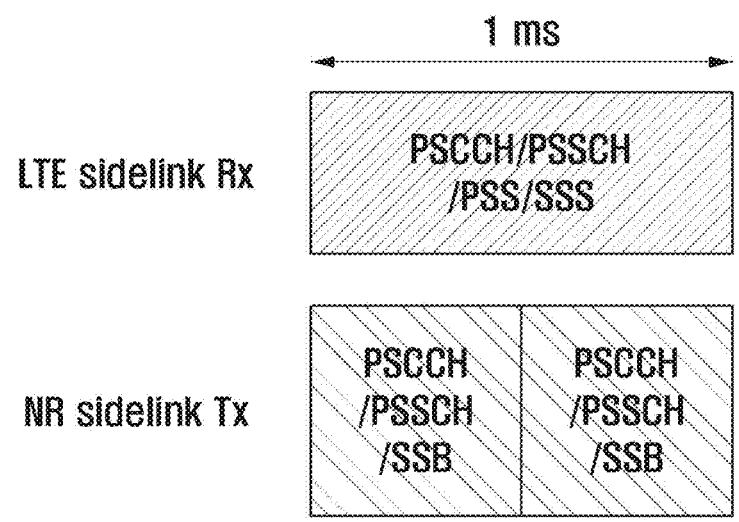
FIG. 12 illustrates an example in which, when groupcast data is transmitted, terminals in a group transmit HARQ-ACK feedback by using different resources according to an embodiment of the disclosure.

FIG. 12 illustrates an example in which a time resource used for reception of an LTE sidelink signal and a channel by a single terminal and a time resource used for transmission of an NR sidelink signal and a channel overlap.

Although the embodiment is described under the assumption that the subframe boundary for LTE sidelink transmission and the subframe boundary for NR sidelink reception match, the method provided by the disclosure can be applied even if the boundary does not match. As illustrated in FIG. 12, when there is data to be transmitted through an NR sidelink or data transmission therethrough is scheduled, a terminal needs to transmit the relevant signal and channel through the NR sidelink, and at the same time, the terminal needs to receive the LTE sidelink signal through a time resource used for reception of the LTE sidelink signal. However, if a terminal is unable to simultaneously perform transmission and reception, that is, the terminal is in a situation, such as an example of FIG. 12, in which the corresponding terminal has a half-duplex restriction, the terminal selects and performs one of LTE sidelink reception and NR sidelink transmission. This can be defined as the case where an event occurs.

When the above event occurs or when the event is identified or determined, the terminal may use one of the following methods or combine and use one or more methods among the following methods in order to perform transmission and reception operations. When one or more methods are used in combination, priorities may be pre-configured for different methods.

Method 1: Transmission of an NR sidelink signal or a channel is always possible. Method 1 may be applied when there is data or a control signal to be transmitted through the NR sidelink. This is because there is no guarantee that there is a signal or a physical channel to be received through the LTE sidelink at a time when the NR sidelink transmission needs to be performed. Therefore, an LTE sidelink reception operation may be omitted at a time when a synchronization signal, a PSSCH, a PSCCH, or the like are transmitted through the NR sidelink. The LTE sidelink reception operation may include data decoding and blind reception operation (blind detection) of a control channel.

Method 2: Transmission and reception operations may be determined by using a QoS parameter of an NR sidelink data packet to be transmitted. The QoS parameter may include a priority, a latency, a reliability, and a target range. In the following description, a priority is given as an example of the QoS parameter, but may not be limited thereto. It is possible to determine whether to transmit an NR-PSSCH or perform an LTE sidelink reception operation by comparing a priority of a transport block to be transmitted through the NR-PSSCH with a preconfigured priority threshold. The priority may be a value determined based on a priority transmitted from a higher layer, and may be determined based on values such as a ProSe per-packet priority (PPPP) or a ProSe per-packet reliability (PPPR). For example, when the priority of a transport block to be transmitted through the NR-PSSCH is called N_NR, and the preconfigured priority threshold is called Priority_threshold, the NR-PSSCH may be transmitted when N_NR is less than or equal to Priority_threshold as a result of comparison between the N_NR and the Priority_threshold. That is, in the above case, the NR sidelink transmission operation is performed. On the contrary, when N_NR is greater than Priority_threshold, an LTE sidelink reception operation is performed instead of an NR sidelink transmission operation. The Priority_threshold may be determined according to the base station configuration, but may be a value fixed in advance or a value which is changed and applied according to an NR sidelink configuration or a region.

Method 3: When the NR-PSSCH is transmitted, it may be determined whether to perform NR sidelink transmission or LTE sidelink reception according to whether retransmission of a transport block transmitted through the NR-PSSCH is possible. If the transport block to be transmitted through the NR-PSSCH is retransmitted, an LTE sidelink reception operation may be performed instead of an NR sidelink transmission operation. This is because the same transport block has already been initially transmitted and thus a gain obtained by performing retransmission may not be great.

Method 4: It is possible to determine whether to perform LTE sidelink reception or NR sidelink transmission according to the type of a signal or a channel to be received through the NR sidelink. For example, when HARQ-ACK feedback for data previously transmitted through the NR sidelink in a corresponding slot is scheduled to be transmitted, a terminal may perform an NR sidelink transmission operation instead of an LTE sidelink reception operation. Alternatively, when HARQ-ACK feedback for data previously transmitted through the NR sidelink in the corresponding slot is scheduled to be transmitted, it is possible to determine whether to perform LTE sidelink reception or NR sidelink transmission according to the previously transmitted data or data to be transmitted, that is, the priority value of the corresponding transport block. In the above, whether to perform LTE sidelink reception or NR sidelink transmission may be determined by using a different quality of service (QoS) value instead of the priority value of the data previously transmitted through the NR sidelink or data to be transmitted therethrough. In addition, method 4 may be a method for determining whether to perform LTE sidelink reception or NR sidelink transmission depending on whether a candidate signal or channel to be transmitted through the NR sidelink is a signal or channel for synchronization purposes, or a data channel or a feedback channel.

A method that needs to be used among the above methods may be preconfigured in a terminal, or may be configured via higher layer signaling. In addition, the terminal may previously receive parameters required for determining each of the above methods from a base station.

Third Embodiment

The third embodiment relates to a method enabling coexistence of LTE sidelink transmission and reception and NR sidelink transmission and reception, and describes a method obtained by combining the methods provided in the first and second embodiments. The first embodiment provides a method for coexistence of LTE sidelink transmission and NR sidelink reception, and the second embodiment provides a method for coexistence of LTE sidelink reception and NR sidelink transmission. In the situation as shown in the example of FIG. 11, that is, an event, in which a terminal needs to select and perform one of LTE sidelink transmission and NR sidelink reception, may occur. Hereinafter, for convenience of description, the event may be referred to as event A. Meanwhile, in the situation as shown in the example of FIG. 12, that is, an event, in which a terminal needs to select and perform one of LTE sidelink reception and NR sidelink transmission, may occur. Hereinafter, for convenience of description, the event may be referred to as event B.

For example, the terminal may always perform LTE sidelink transmission in the situation of event A, and may always perform NR sidelink transmission in the situation of event B. The transmission operation may be performed because there is uncertainty about the existence of a received signal. Alternatively, in the situation of event A, the terminal may determine whether to perform data transmission by comparing a QoS value such as a priority of data to be transmitted through the LTE sidelink with a preconfigured QoS value. In the situation of event B, the terminal may determine whether to perform data transmission by comparing QoS values such as a priority, a latency, or the like of data to be transmitted through the NR sidelink with a preconfigured QoS value.

Fourth Embodiment

The fourth embodiment describes a method of transmitting control information through a sidelink.

The sidelink control information (SCI) may include sidelink feedback control information (SFCI). The SCI may be transmitted through a physical sidelink control channel (PSCCH) or a physical sidelink feedback channel (PSFCH). The SCI and SFCI may be transmitted to a reception terminal by including at least one of the following pieces of information therein.

Forward/backward scheduling indicator: An indicator indicating whether a terminal transmitting control information also transmits data or a terminal receiving control information transmits data.

HARQ-ACK feedback piggyback indicator: An indicator indicating whether HARQ-ACK feedback is transmitted together with or without data.

Bitmap indicator indicating transmission of HARQ-ACK information corresponding to an indicated HARQ process: If the corresponding bit is "1", HARQ-ACK information corresponding to the corresponding HARQ process needs to be transferred or transmitted.

Indicator which indicates whether an RS for measurement of a channel state is being transmitted or which is used for transferring RS configuration information Indicator for triggering channel state reporting The information included in the SCI or SFCI may include at least one of pieces of information described above.

Fifth Embodiment

The fifth embodiment relates to a resource pool configuration method and apparatus, which allows a single terminal not to simultaneously perform LTE sidelink transmission and reception and NR sidelink transmission and reception, and the fifth embodiment is described with reference to FIGS. 15, 16, 17, 18, 19, and 20.

Figure 15:
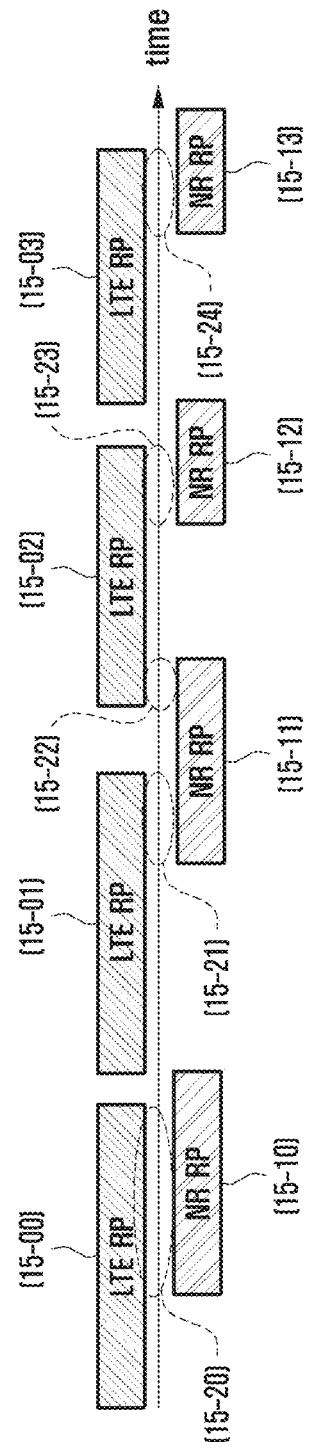
FIG. 15 illustrates assignment of resource pools for LTE sidelink transmission and reception by a terminal and resource pools for NR sidelink transmission and reception to specific time domains.

FIG. 15 illustrates assignment of resource pools 15-00, 15-01, 15-02, and 15-03 for LTE sidelink transmission and reception by a single terminal and resource pools 15-10, 15-11, 15-12, and 15-13 for NR sidelink transmission and reception to specific time domains.

Referring to FIG. 15, the terminal may perform sidelink transmission or reception in each of the resource pools, which are predetermined or configured. There may be time resources 15-20, 15-21, 15-22, 15-23, and 15-24 having time domains in which resource pools for LTE sidelink transmission and reception and resource pools for NR sidelink transmission and reception overlap. Therefore, in the time domains 15-20, 15-21, 15-22, 15-23, and 15-24 in which both the LTE sidelink resource pool and the NR sidelink resource pool are assigned, the terminal may simultaneously perform an LTE sidelink transmission or reception operation and an NR sidelink transmission or reception operation, or may select and perform one of the LTE sidelink operation and the NR sidelink operation. If the terminal is able to randomly determine to select and perform one of the LTE sidelink operation and the NR sidelink operation, the base station capable of scheduling the sidelink may have difficulty in efficiently managing the corresponding frequency band because the base station may not include information relating to operation of the terminal.

Figure 16:
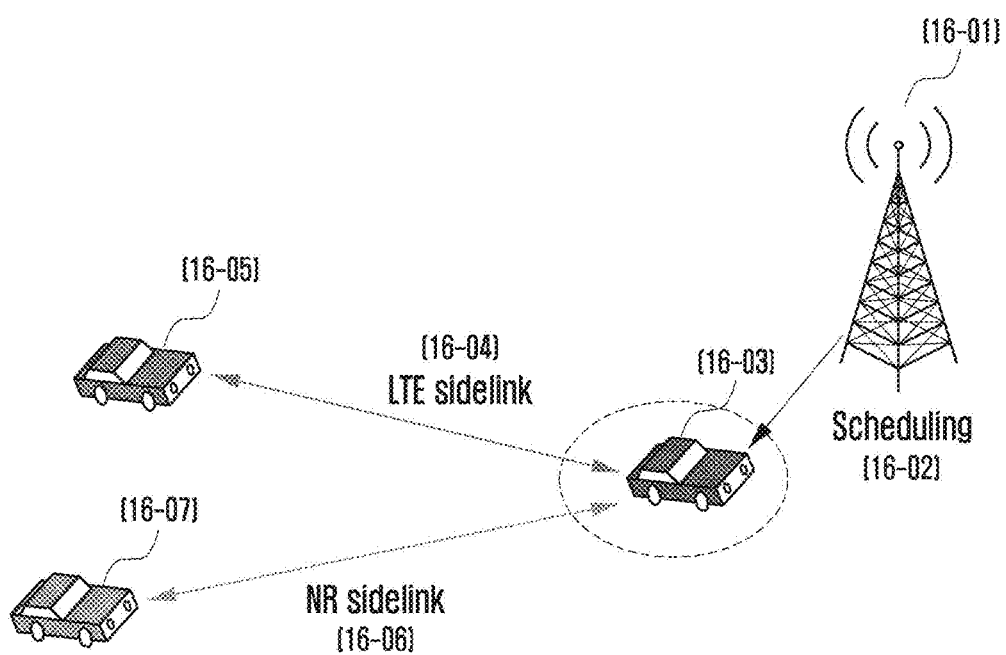
FIG. 16 illustrates an example in which a terminal, which is performing LTE sidelink transmission and reception and NR sidelink transmission and reception, receives scheduling for sidelink signal transmission and reception from a base station or receives configuration information of a resource pool and the like from the base station.

FIG. 16 illustrates an example in which a terminal 16-03, which is performing LTE sidelink transmission and reception 16-04 and NR sidelink transmission and reception 16-06, receives scheduling 6-02 for sidelink signal transmission and reception from a base station or receives configuration information of resource pool and the like from a base station 16-01.

For example, in FIG. 16, when a base station 16-01 is scheduling the NR sidelink transmission and reception 16-06 of the terminal 16-03, a time resource used for the NR sidelink transmission and reception 16-06 scheduled by the base station 16-01 overlaps a time resource used for the LTE sidelink transmission and reception 16-04, and thus the NR sidelink transmission and reception 16-06 may not be performed. This is because when the NR sidelink transmission and reception is scheduled to be performed in the same time resource as that for the LTE sidelink transmission and reception, the terminal 16-03 is capable of performing the LTE sidelink transmission and reception.

Figure 17:
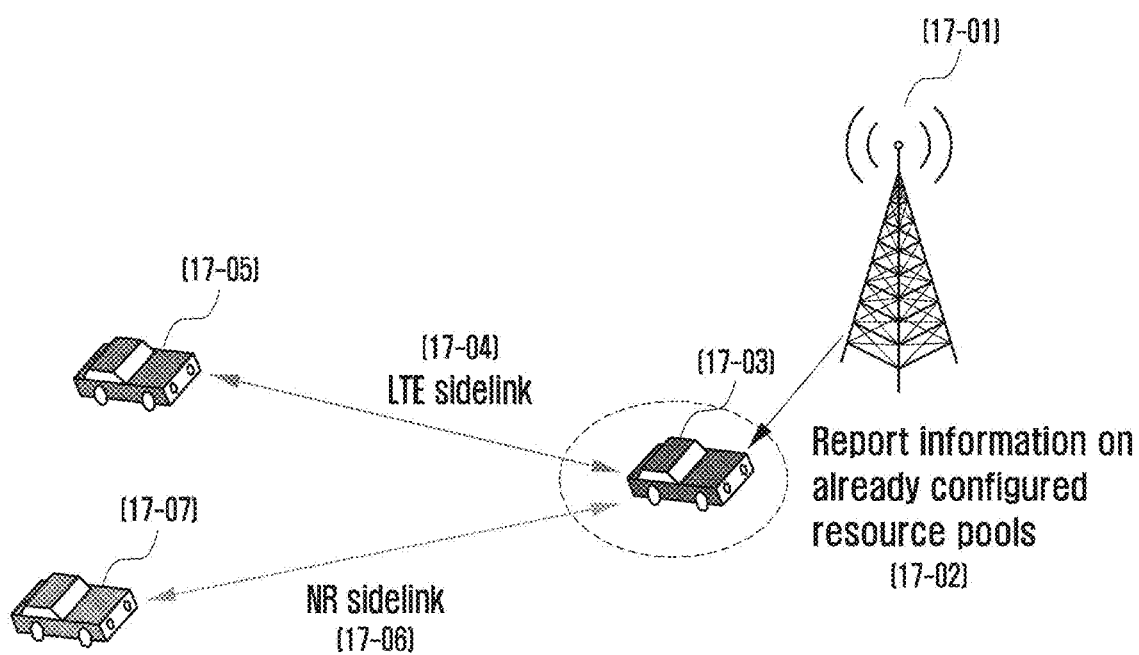
FIG. 17 illustrates an example in which a terminal, which is performing LTE sidelink transmission and reception or NR sidelink transmission and reception, reports, to a base station, information on a resource pool for sidelink transmission and reception being performed.

FIG. 17 illustrates an example in which a terminal 17-03, which is performing LTE sidelink transmission and reception 17-04 or NR sidelink transmission and reception 17-06, reports, to a base station 17-01, information 17-02 on a resource pool for sidelink transmission and reception being performed.

As an example, the terminal 17-03 may receive a transmission and reception resource pool configuration for LTE sidelink transmission and reception 17-04, and may be in the middle of performing an LTE sidelink operation. In order to allow the terminal 17-03 to access the base station 17-01 to perform the NR sidelink transmission and reception 17-06, the base station 17-01 may transmit, to the terminal 17-03, an instruction or a request to report a part or all of configuration information possessed by the terminal 17-03, to perform current LTE or NR sidelink transmission and reception of the terminal. In order to perform the current LTE or NR sidelink transmission and reception of the terminal 17-03 to or from the base station 17-01 according to the instruction and the request, the terminal 17-03 may transmit a part or all of the configuration information possessed by the terminal 17-03 to the base station 17-01. The sidelink configuration information may include the following pieces of information.

---

SL-CommResourcePool information element

-ASN1START
SL-CommTxPoolList-r12 :: = SEQUENCE (SIZE (1..maxSL-TxPool-r12)) OF SL-CommResourcePool-r12

-continued

| SL-CommResourcePool information element |
|---|
| SL-CommTxPoolListExt-r13 :: = SEQUENCE (SIZE (1..maxSL-TxPool- v1310)) OF SL-CommResourcePool-r12<br>SL-CommTxPoolListV2X-r14 :: = SEQUENCE (SIZE (1..maxSL-V2X- TxPool-r14)) OF SL-CommResourcePoolV2X-r14<br>SL-CommRxPoolList-r12 :: = SEQUENCE (SIZE (1..maxSL-RxPool-r12)) OF SL-CommResourcePool-r12<br>SL-CommRxPoolListV2X-r14 :: = SEQUENCE (SIZE (1..maxSL-V2X- RxPool-r14)) OF SL-CommResourcePoolV2X-r14<br>SL-CommResourcePool-r12 :: = SEQUENCE {<br>  sc-CP-Len-r12 SL-CP-Len-r12,<br>  sc-Period-r12 SL-PeriodComm-r12,<br>  sc-TF-ResourceConfig-r12 SL-TF-ResourceConfig-r12,<br>  data-CP-Len-r12 SL-CP-Len-r12,<br>  dataHoppingConfig-r12 SL-HoppingConfigComm-r12,<br>  ue-SelectedResourceConfig-r12 SEQUENCE {<br>  data-TF-ResourceConfig-r12 SL-TF-ResourceConfig-r12,<br>  trpt-Subset-r12 SL-TRPT-Subset-r12 OPTIONAL-Need OP<br>  } OPTIONAL,-Need OR<br>  rxParametersNCell-r12 SEQUENCE {<br>  tdd-Config-r12 TDD-Config OPTIONAL,-Need OP<br>  syncConfigIndex-r12 INTEGER (0..15)<br>  } OPTIONAL,-Need OR<br>  txParameters-r12 SEQUENCE {<br>  sc-TxParameters-r12 SL-TxParameters-r12,<br>  dataTxParameters-r12 SL-TxParameters-r12<br>  } OPTIONAL,-Cond Tx<br>  ...,<br>  [[priorityList-r13 SL-PriorityList-r13 OPTIONAL-Cond Tx<br>  ]]<br>}<br>SL-CommResourcePoolV2X-r14 :: = SEQUENCE {<br>  sl-OffsetIndicator-r14 SL-OffsetIndicator-r12 OPTIONAL,-Need OR<br>  sl-Subframe-r14 SubframeBitmapSL-r14,<br>  adjacencyPSCCH-PSSCH-r14 BOOLEAN,<br>  sizeSubchannel-r14 ENUMERATED {<br>  n4, n5, n6, n8, n9, n10, n12, n15, n16, n18, n20, n25, n30,<br>  n48, n50, n72, n75, n96, n100, spare13, spare12, spare11,<br>  spare10, spare9, spare8, spare7, spare6, spare5, spare4,<br>  spare3, spare2, spare1},<br>  numSubchannel-r14 ENUMERATED {n1, n3, n5, n8, n10, n15, n20, spare1},<br>  startRB-Subchannel-r14 INTEGER (0..99),<br>  startRB-PSCCH-Pool-r14 INTEGER (0..99) OPTIONAL,-Need OR<br>  rxParametersNCell-r14 SEQUENCE {<br>  tdd-Config-r14 TDD-Config OPTIONAL,-Need OP<br>  syncConfigIndex-r14 INTEGER (0..15)<br>  } OPTIONAL,-Need OR<br>  dataTxParameters-r14 SL-TxParameters-r12 OPTIONAL,-Cond Tx<br>  zoneID-r14 INTEGER (0..7) OPTIONAL,-Need OR<br>  threshS-RSSI-CBR-r14 INTEGER (0..45) OPTIONAL,-Need OR<br>  poolReportId-r14 SL-V2X-TxPoolReportIdentity-r14 OPTIONAL,-Need OR<br>  cbr-pssch-TxConfigList-r14 SL-CBR-PPPP-TxConfigList-r14 OPTIONAL,- Need OR<br>  resourceSelectionConfigP2X-r14 SL-P2X-ResourceSelectionConfig-r14 OPTIONAL,-Cond P2X<br>  syncAllowed-r14 SL-SyncAllowed-r14 OPTIONAL,-Need OR<br>  restrictResourceReservationPeriod-r14 SL-RestrictResourceReservationPeriodList-r14 OPTIONAL,-Need OR<br>  ...,<br>  [[sl-MinT2ValueList-r15 SL-MinT2ValueList-r15 OPTIONAL,-Need OR<br>  cbr-pssch-TxConfigList-v1530 SL-CBR-PPPP-TxConfigList-v1530 OPTIONAL-Need OR<br>  ]]<br>}<br>SL-TRPT-Subset-r12 :: = BIT STRING (SIZE (3..5))<br>SL-V2X-TxPoolReportIdentity-r14 :: = INTEGER (1..maxSL-PoolToMeasure-r14)<br>SL-MinT2ValueList-r15 :: = SEQUENCE (SIZE (1..maxSL-Prio-r13)) OF SL-MinT2Value-r15<br>SL-MinT2Value-r15 :: = SEQUENCE {<br>  priorityList-r15 SL-PriorityList-r13,<br>  minT2Value-r15 INTEGER (10..20)<br>}<br>-ASN1STOP |

The above pieces of information are examples of resource pool configuration information that can be used for LTE V2X or D2D operation. The resource pool configuration information may include information such as a frequency resource and a time resource region, and a part or all of the configuration information may be transmitted by the corresponding terminal 17-03 to the base station 17-01. The base station 17-01 may configure a resource pool for NR sidelink transmission and reception based on the received information, so that LTE- and NR-based sidelink operations are not required to be simultaneously performed when the terminal 17-03 performs LTE sidelink transmission and reception and then performs NR sidelink transmission and reception.

Figure 18:
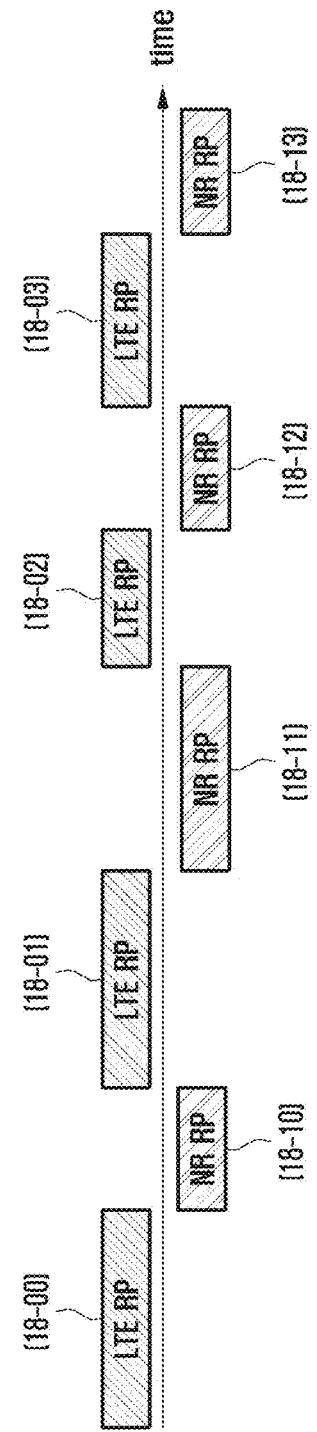
FIG. 18 illustrates assignment of resource pools for LTE sidelink transmission and reception by a single terminal and resource pools for NR sidelink transmission and reception to specific time domains.

FIG. 18 illustrates assignment of resource pools 18-00, 18-01, 18-02, and 18-03 for LTE sidelink transmission and reception by a single terminal and resource pools 18-10, 18-11, 18-12, and 18-13 for NR sidelink transmission and reception to specific time domains.

The terminal may perform sidelink transmission or reception in each of the resource pools, which are predetermined or configured. As illustrated in FIG. 17, the base station 17-01 may configure a resource pool for NR sidelink transmission and reception based on the received information, so that LTE- and NR-based sidelink operations are not required to be simultaneously performed when the terminal 17-03 performs the LTE sidelink transmission and reception and then performs the NR sidelink transmission and reception. As a result, as shown in FIG. 18, resource pools 18-00, 18-01, 18-02, and 18-03 for LTE sidelink transmission and reception and resource pools 18-10, 18-11, 18-12, and 18-13 for NR sidelink transmission and reception may be configured not to overlap in the time domain. Accordingly, resource pool assignment may be configured such that time resources 15-20, 15-21, 15-22, 15-23, and 15-24, having time domains in which resource pools for LTE sidelink transmission and reception and resource pools for NR sidelink transmission and reception overlap as shown in FIG. 15, do not exist. Alternatively, the base station may configure a resource pool for NR sidelink so as to minimize an overlapping part in the time domain. According to such a configuration, the base station may not generate a case in which the terminal does not randomly perform the NR sidelink operation, and thus may efficiently manage the corresponding frequency band.

Embodiments in FIGS. 17 and 18 have been described with respect to reporting information on the resource pool for the LTE sidelink to a base station by a terminal while performing the LTE sidelink operation. However, embodiments of the disclosure are not limited thereto, the embodiments may include reporting information on the resource pool for the NR sidelink to a base station by a terminal while performing the NR sidelink operation. In addition, in the embodiments of the disclosure, the base station may be a gNB and may also be an eNB.

Figure 19:
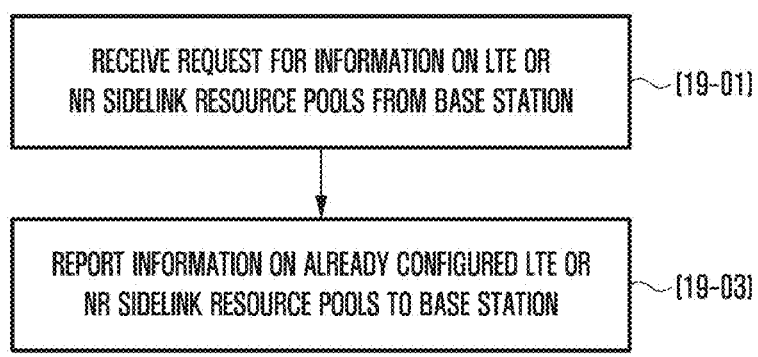
FIG. 19 illustrates a terminal operation according to a fifth embodiment of the disclosure.

FIG. 19 illustrates a terminal operation according to a fifth embodiment of the disclosure.

Referring to FIG. 19, the terminal may receive a request for information on resource pools for an LTE sidelink or an NR sidelink from a base station (indicated by reference numeral 19-01). The request may be delivered via higher layer signaling or a physical layer signal. In the above, the terminal having received a request from the base station reports information on already configured or included resource pools for LTE or NR sidelink to the base station (indicated by reference numeral 19-03). The terminal may receive new LTE or NR sidelink resource pool information, which is configured such that the LTE sidelink resource pool and the NR sidelink resource pool do not overlap on the time axis as shown in the example of FIG. 18, or the overlapping portion is minimized, based on the resource pool information for the LTE or NR sidelink. The UE may perform LTE sidelink transmission and reception and/or NR sidelink transmission and reception, based on the new LTE or NR sidelink resource pool information.

Figure 20:
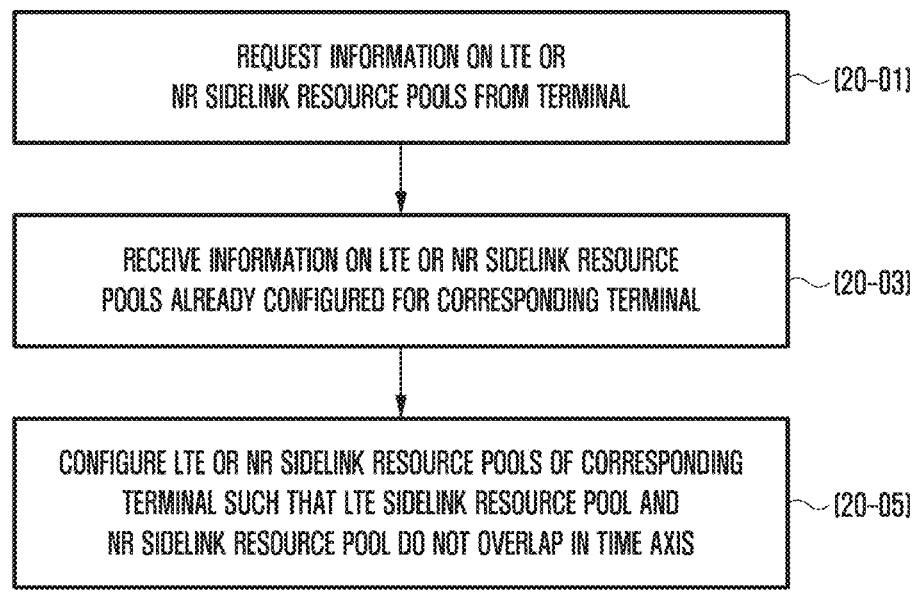
FIG. 20 illustrates a base station operation according to a fifth embodiment of the disclosure.

FIG. 20 illustrates a base station operation according to a fifth embodiment of the disclosure.

Referring to FIG. 20, a base station may request a terminal to report information on LTE or NR sidelink resource pools (indicated by reference numeral 20-01). Thereafter, the terminal reports the information on LTE or NR sidelink resource pools to the base station, and the base station may receive information on the LTE or NR sidelink resource pools (indicated by reference numeral 20-03). The base station may configure the LTE or the NR sidelink resource pool of the corresponding terminal such that the LTE sidelink resource pool and the NR sidelink resource pool do not overlap in the time axis as shown in the example of FIG. 18 or the overlapping portion is minimized (indicated by reference numeral 20-05).

Figure 13:
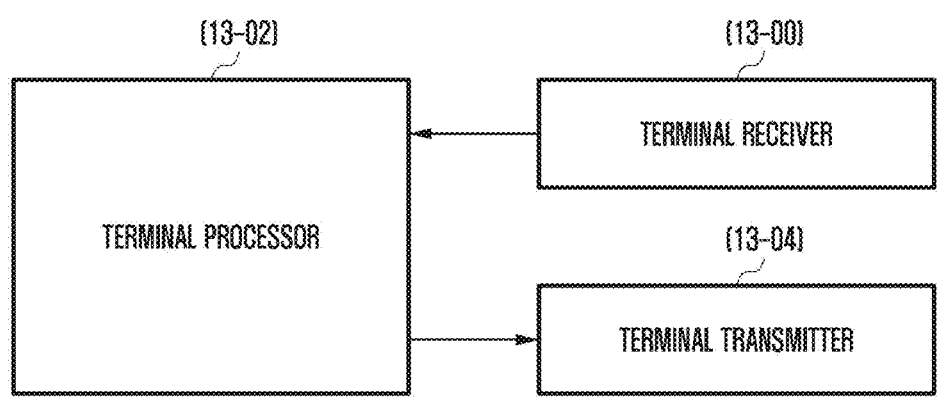
FIG. 13 illustrates the configuration of a terminal according to embodiments of the disclosure.
Figure 14:
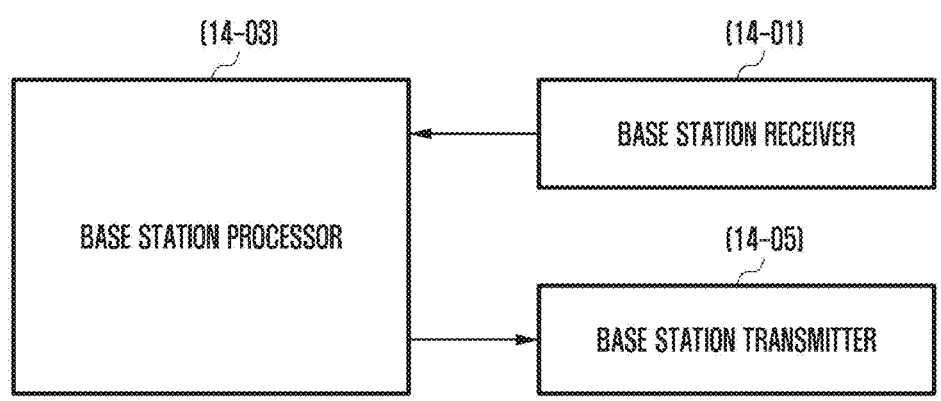
FIG. 14 illustrates a configuration of a base station according to embodiments of the disclosure.

In order to perform the above embodiments of the disclosure, a transmitter, a receiver, and a processor of a terminal and a base station are illustrated in FIGS. 13 and 14, respectively. In the above embodiments, a method for transmitting a HARQ-ACK by a terminal is determined, and a transmission/reception method by a terminal or a base station in order to perform AGC is illustrated. In order to perform the method, the receiver, the processor, and the transmitter of the base station and the terminal need to operate according to embodiments. In the following operation, the base station may be a terminal performing transmission on the sidelink, or may be a conventional base station. In the following operation, the terminal may be a terminal that performs transmission or reception on the sidelink.

Specifically, FIG. 13 illustrates the configuration of a terminal according to an embodiment of the disclosure.

As illustrated in FIG. 13, the terminal of the disclosure may include a terminal receiver 13-00, a terminal transmitter 13-04, and a terminal processor 13-02. The terminal receiver 13-00 and the terminal transmitter 13-04 are collectively referred to as a transceiver in an embodiment of the disclosure. The transceiver may transmit or receive a signal to or from a base station, another terminal, or a network node. The signal may include control information and data. To this end, the transceiver may include an RF transmitter configured to up-convert and amplify the frequency of a transmitted signal, and an RF receiver configured to perform low-noise amplification of a received signal and down-convert the frequency of the signal, and the like. In addition, the transceiver may receive a signal through a wireless channel, output the received signal to the terminal processor 13-02, and transmit a signal output from the terminal processor 13-02 through a wireless channel. The terminal processor 13-02 may control a series of processes to allow the terminal to be operated according to the aforementioned embodiments of the disclosure. The terminal processor 13-02 may be referred to as a controller, and may include at least one processor.

FIG. 14 illustrates the configuration of a base station according to an embodiment of the disclosure.

As shown in FIG. 14, a base station of the disclosure may include a base station receiver 14-01, a base station transmitter 14-05, and a base station processor 14-03. The base station receiver 14-01 and the base station transmitter 14-05 may be collectively referred to as a transceiver in an embodiment of the disclosure. The transceiver may transmit or receive a signal to or from a terminal, another base station, or a network node. The signal may include control information and data. To this end, the transceiver may include an RF transmitter configured to up-convert and amplify the frequency of a transmitted signal, an RF receiver configured to perform low-noise amplification of a received signal and down-convert the frequency of the signal. In addition, the transceiver may receive a signal through a wireless channel, output the received signal to the base station processor 14-03, and transmit a signal output from the base station processor 14-03 through a wireless channel. The base station processor 14-03 may control a series of processes to allow the base station to be operated according to the aforementioned embodiments of the disclosure. The base station processor 13-02 may be referred to as a controller, and may include at least one processor.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, the first and fourth embodiments may be applied in combination. Further, for the above embodiments, other variants based on the technical idea of the embodiments may be implemented in LTE systems, 5G systems, and the like.

The invention claimed is:

1. A method for transmitting or receiving a sidelink channel or a sidelink signal by a terminal in a mobile communication system, the method comprising:
    identifying a first resource for transmission of a first channel or a first signal associated with a first communication system;
    identifying a second resource for reception of a second channel or a second signal associated with a second communication system;
    identifying that the first resource and the second resource overlap in time; and
    receiving the second channel or the second signal associated with the second communication system, in case that a priority of the second channel or the second signal is higher than a priority of the first channel or the first signal,
    wherein, in case that the second channel or the second signal associated with the second communication system corresponds to a physical sidelink feedback channel (PSFCH) including hybrid automatic repeat request acknowledgement (HARQ-ACK) information, a priority of the PSFCH is equal to a priority of a physical sidelink shared channel (PSSCH) corresponding to the PSFCH.

2. The method of claim 1, further comprising transmitting the first channel or the first signal associated with the first communication system, in case that the priority of the first channel or the first signal is higher than the priority of the second channel or the second signal.

3. The method of claim 1, wherein the priority of the first channel or the first signal and the priority of the second channel or the second signal are determined based on a ProSe per-packet priority (PPPP).

4. The method of claim 1, wherein the first communication system corresponds to a long-term evolution (LTE)

communication system, and the second communication system corresponds to a new radio (NR) communication system.

5. A terminal in a mobile communication system, the terminal comprising:
- a transceiver for transmitting or receiving a sidelink channel or a sidelink signal to or from a base station or another terminal; and
- a controller configured to:
  - identify a first resource for transmission of a first channel or a first signal associated with a first communication system,
  - identify a second resource for reception of a second channel or a second signal associated with a second communication system,
  - identify that the first resource and the second resource overlap in time, and
  - receive the second channel or the second signal associated with the second communication system, in case that a priority of the second channel or the second signal is higher than a priority of the first channel or the first signal,
- wherein, in case that the second channel or the second signal associated with the second communication system corresponds to a physical sidelink feedback channel (PSFCH) including hybrid automatic repeat request acknowledgement (HARQ-ACK) information, a priority of the PSFCH is equal to a priority of a physical sidelink shared channel (PSSCH) corresponding to the PSFCH.

6. The terminal of claim 5, wherein the controller is further configured to transmit the first channel or the first signal associated with the first communication system, in case that the priority of the first channel or the first signal is higher than the priority of the second channel or the second signal.

7. The terminal of claim 5, wherein the priority of the first channel or the first signal and the priority of the second channel or the second signal are determined based on a ProSe per-packet priority (PPPP).

8. The terminal of claim 5, wherein the first communication system corresponds to a long-term evolution (LTE) communication system, and the second communication system corresponds to a new radio (NR) communication system.

* * * * *